July 14, 1936.  C. SAURER  2,047,493
VIBRATION INSULATOR
Filed April 4, 1931  2 Sheets-Sheet 1
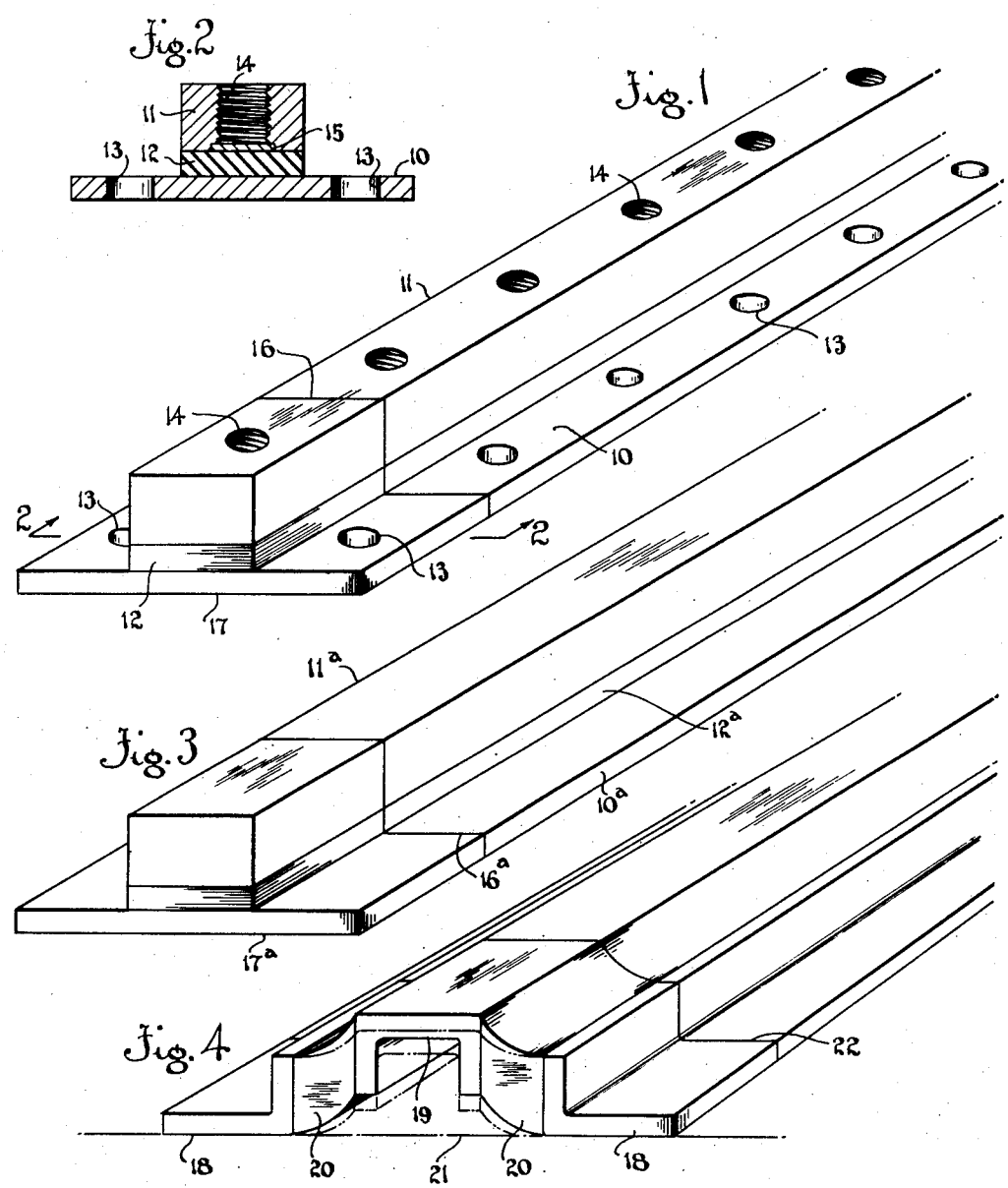
INVENTOR
Curt Saurer
BY
ATTORNEYS

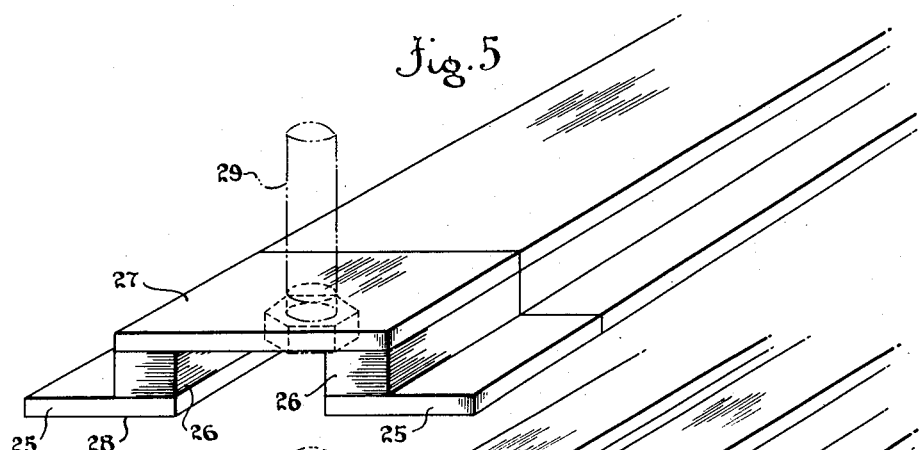
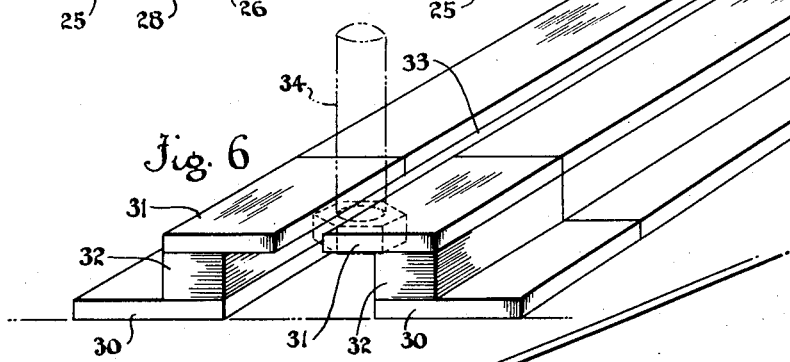
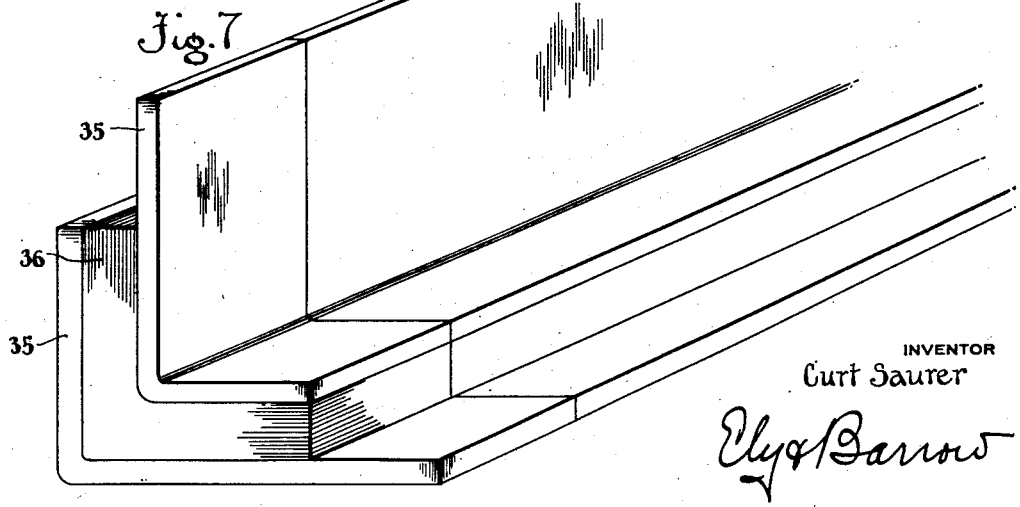

Patented July 14, 1936

2,047,493

UNITED STATES PATENT OFFICE 2,047,493

VIBRATION INSULATOR

Curt Saurer, Akron, Ohio, assignor to The Firestone Tire & Rubber Company, Akron, Ohio, a corporation of Ohio Application April 4, 1931, Serial No. 527,756

15 Claims. (Cl. 248—358)

This invention relates to vibration insulators and to methods of making the same, and more especially it relates to the manufacture of vibration insulators comprising rubber, which insulators may be used as resilient supports or for other types of yielding or flexible connections.

The chief objects of the invention are to effect economy in the manufacture of vibration insulators; to provide for the economical and facile production of various vibration insulators of the same structure but of different lengths and drilling; to provide vibration insulators of novel construction having the aforesaid advantages; and to provide an improved method of manufacturing vibration insulators.

Of the accompanying drawings:

Figure 1 is a perspective view of a vibration insulator embodying and made according to the invention.

Figure 2 is a section on the line 2—2 of Figure 1.

Figure 3 is a modified form of the embodiment shown in Figure 1.

Figures 4, 5, 6, and 7 are other embodiments of the invention.

As is shown in the drawings, the respective structures embodying the invention are of indefinite length. In practice, the respective insulators are made in conveniently long lengths, sufficient to provide a plurality of individual insulators, and are so furnished to the customer who severs them transversely into individual insulators of the length desired. The insulators may or may not be provided with apertures for the reception of attaching means such as bolts since in some cases these are made by the customer to fit a particular installation. However, the invention contemplates the feature of insulators having threaded holes formed in the metal parts thereof before assembly with the rubber portion of the structure, and provision is made for preventing the entry of rubber into the threaded holes.

Referring to Figures 1 and 2 of the drawings, 10 is a metal base strip, 11 is a metal strip of the same length but narrower width than the base strip 10 superposed on the latter centrally thereof, and 12 is a cushion of resilient rubber positioned between the strips 10, 11 and bonded to each of them, preferably by vulcanization. The base strip 10 may be formed with a longitudinal series of apertures 13, 13 laterally of the strips 11, 12 at each side thereof, but preferably these apertures are formed therein after the strip is subsequently severed into individual units. The strip 11 is formed with a longitudinal series of threaded holes 14, 14 having axes parallel to the axes of the apertures 13. On the inner face of the strip 11, which face is vulcanized to the rubber cushion 12, the holes 14 are countersunk, and respective metal disks 15 (Figure 2) are fitted into each of said countersinks to prevent the rubber of the cushion 12 from flowing into the holes 14. The composite strip subsequently is transversely severed as at 16 to provide a plurality of individual insulators 17.

The embodiment of the invention shown in Figure 3 comprises a base strip 10ª, superposed strip 11ª, and intermediate rubber cushion 12ª bonded to said strips, all of which parts are identical with corresponding parts of the structure shown in Figures 1 and 2 except that the apertures and threaded holes are omitted. The assembled strip subsequently is transversely severed, by the customer, at 16ª to provide a plurality of individual strips such as the strip 17ª. The strips 17ª subsequently are suitably drilled by the customer to fit the particular installation in which they are employed. The structure shown in Figure 3 may be severed into individual strips 17ª of any suitable length, and thus has a certain advantage over the structure shown in Figure 1 wherein the severing bears a determinate relation to the drilling.

The structure shown in Figure 4 comprises parallel, spaced-apart, angular lateral strips 18, 18, a channel strip 19 positioned between the strips 18 and parallel thereto, the base of the channel preferably being uppermost and the entire strip being somewhat elevated with relation to the strips 18, and cushions of resilient rubber 20, 20 vulcanized to the respective lateral faces of the channel and to the adjacent lateral faces of the respective angle strips 18. At least the bottom face of each cushion 20 is arcuate as shown, the arrangement being such that as the channel 19 is depressed during use the bottom face of each cushion progressively makes contact, as shown in the dotted line position, with the surface 21 of the supporting structure (not shown) upon which the lateral strips 18 are mounted, with the result that the cushions 20 offer progressively increasing resistance to deflection when put under compression by downward movement of the channel 19. The structure is made in indefinite lengths and subsequently is severed as at 22 into individual strips of the desired length.

The structure shown in Figure 5 comprises a pair of parallel, spaced-apart, metal base strips 25, 25, respective cushions of resilient rubber 26, 26 mounted along the adjacent edges of the strips 25 on the upper faces thereof, and a metal top strip 27 overlying the rubber cushions 26 and spanning the space between the strips 25, the surfaces of the rubber cushions being bonded to the adjacent surfaces of said strips. As in the other embodiments of the invention, the structure is of indefinite length and is severed into individual units 28 by the customer. The customer also drills the units as desired, the bridge-like construction of the insulator facilitating the mounting of bolts, such as the bolt 29 indicated in broken lines, through the top strip 27.

In Figure 6 is shown a vibration insulator comprising a pair of duplicate rubber and metal assemblies each consisting of a metal base strip 30, a parallel, metal top strip 31 extending longitudinally thereof and partially in overlapping relation therewith, and a resilient rubber cushion strip 32 mounted between the overlapping portions of strips 30 and 31, leaving free margins of the metal strips extending laterally on opposite sides of the cushion strip. As in all other embodiments of the invention, the adjacent surfaces of the metal and the rubber cushion strips are vulcanized or bonded together and the structure is of indefinite length to permit severing into individual units of shorter length, and to permit drilling as desired. A pair of units are assembled in juxtaposition as shown in Figure 6, leaving a space 33 therebetween to receive bolts such as the bolt 34 indicated in broken lines, the heads of the bolts being disposed beneath the top strips 31 as shown.

Figure 7 shows a vibration insulator comprising a pair of angle strips 35, 35, each of which has legs of unequal length, said strips being disposed in parallel, spaced-apart relation to each other, the long leg of each strip being positioned beside the short leg of the other strip so as to extend laterally beyond the same. A cushion 36 of resilient rubber is positioned between the strips and vulcanized or bonded to both of them. The insulator is of indefinite length, and is severed into service lengths and drilled by the customer, the drill-holes being disposed in the marginal portion of the long leg of each strip 35.

The several embodiments of the invention described have the common feature of indefinite length which facilitates the manufacture of the strips, and also permits the customer to cut them to proper lengths and to drill them to fit his particular requirement. This results in lower cost of the insulators, and permits various customers to use the same type of insulator without requiring the manufacturer to furnish the same in various lengths and with various sizes and spacing of drilling.

The invention may be further modified within the scope of the appended claims which are not limited wholly to the specific construction shown or described.

What is claimed is:

1. A vibration insulator comprising an elongate structure of substantially parallel plates, and rubber cushions bonded to said plates, the respective areas of contact between the metal plates and rubber being offset so that the rubber is put under compression by relative movement of said metal plates in parallel planes tending to move said areas in juxtaposed position, said rubber being free to distort beyond the ends of said plates.

2. A vibration insulator comprising a pair of substantially parallel, spaced-apart, metal strips, a third metal strip positioned substantially parallel to the first-mentioned strips, and a pair of rubber cushions disposed between the metal strips, the edges of the rubber cushions between said strips being unconfined and unrestricted by said strips whereby said rubber cushions may be deformed into free space beyond the edges of said respective strips, said rubber cushions being so arranged as to be put under compression by displacement of the last mentioned strip toward the pair of strips.

3. A vibration insulator comprising a pair of parallel, spaced-apart, metal strips, a third metal strip positioned between and parallel to the said pair of strips in partially overlapping condition with respect thereto and offset from the plane thereof, and rubber cushions positioned between the respective strips and so arranged that displacement of the intermediate metal strip to a position in more nearly overlapping condition with respect to the pair of strips applies compressive force to both rubber cushions in the direction of said displacement.

4. A combination as defined in claim 3 in which the rubber cushions are disposed laterally of the respective metal strips.

5. A combination as defined in claim 3 in which the rubber cushions are so shaped as to exert progressively increasing resistance to deflection.

6. A combination as defined in claim 3 in which the vibration insulator is mounted upon a supporting member and the face of each rubber cushion confronting said supporting member is arcuate in shape whereby said face may progressively roll upon the supporting member as the load is applied.

7. A combination as defined in claim 3 in which the vibration insulator is mounted upon a supporting member and the rubber cushions are concavo-convex in shape whereby the convex side of the rubber progressively rolls upon the supporting surface as the load is applied.

8. A vibration insulator comprising a pair of metal strips, a pair of parallel, spaced-apart rubber cushions vulcanized thereto, and a pair of parallel, spaced-apart metal strips vulcanized to the respective cushions, the adjacent margins of the last-named pair of strips defining a slot adapted to receive an attaching device.

9. A vibration insulator comprising a pair of metal strips constituting side pieces adapted to rest upon a supporting member, a third metal strip disposed between said side pieces, said third strip and said side pieces having confronting areas, the areas on said third strip being offset from the confronting areas on said side pieces, and a pair of rubber cushions each of which is interposed between and joined to the confronting areas of said third strip and one of said side strips, said rubber cushions having a surface adapted to contact with the surface of said supporting member over a progressively increasing area when subjected to increasing load.

10. A vibration insulator adapted to support vertical loads comprising a pair of metal strips spaced apart horizontally of each other and constituting side pieces, a third metal strip disposed between said side pieces and constituting a center piece, said center piece having two opposed, substantially vertical faces confronting respective substantially vertical faces formed on said side pieces, the faces on said center piece elevated above the faces on said side pieces, and a pair of rubber cushions disposed one between each face of said center piece and the confronting face of a side piece, said rubber cushions being adhesively bonded by vulcanization to the confronting faces of said metal strips, the rubber cushions being adapted to be placed under shear stress and under vertical compression when said center piece is deflected by vertical loads toward the horizontal level of said side pieces.

11. The combination of a vibration insulator as defined in claim 10 with a support having a substantially horizontal surface upon which said side pieces may be supported, the lower surface of said rubber cushions being convexly curved and extending from said side pieces adjacent said horizontal surface to said center piece at a position elevated above said horizontal surface whereby as said center piece is deflected vertically toward said horizontal surface the lower surfaces of said rubber cushions will come progressively into greater contact with said supporting surface, thereby setting up progressively increasing vertical compression in said rubber cushions.

12. A vibration insulator comprising an elongated rubber and metal arch, the center of said arch constituting the metal portion thereof and including a substantially flat plate, the center portion of said arch being elevated above the side portions thereof, and means including a substantially flat plate for attaching the side portions of said arch to a supporting member, said rubber arch being adapted to be placed under shear stress and under vertical compression when a vertical load is placed upon the center of said arch.

13. A shock-absorbing support including an arch comprising rubber members adapted to be interposed between a supported member and a supporting member, means whereby the side portions of said arch may be connected to one of said members, and means whereby the central portion of said arch may be connected to the other of said members, said arch being adapted to be deflected as to position and deformed in cross-section and shape, by opposed forces respectively acting on said side portions and central portion so as to place the rubber under shear stress and compression substantially in the direction of the forces.

14. A vibration insulator comprising a pair of metal strips, a pair of parallel, spaced-apart rubber cushions vulcanized thereto, and a central metal supporting and attaching means including a pair of parallel, spaced-apart portions vulcanized to the respective cushions, the central portion of said means being adapted to receive an attaching device.

15. A vibration insulator comprising an elongate, central metal supporting and attaching strip, a pair of elongate metal side strips disposed partially in overlapping relation with said central strip and spaced therefrom and from each other, and a pair of elongate, substantially parallel, spaced-apart rubber cushions vulcanized between the overlapping surfaces of said central strip and the respective side strips whereby the pair of spaced-apart rubber cushions may be placed under compression by a load supported on the central strip.

CURT SAURER.